(12) United States Patent
Booth

(10) Patent No.: US 7,837,152 B2
(45) Date of Patent: Nov. 23, 2010

(54) RETRACTABLE SAFETY RIPCORD

(76) Inventor: William R. Booth, 2317 E. New York Ave., DeLand, FL (US) 32724

( * ) Notice: Subject to any disclaimer, the term of this patent is extended or adjusted under 35 U.S.C. 154(b) by 375 days.

(21) Appl. No.: 12/011,729

(22) Filed: Jan. 29, 2008

(65) Prior Publication Data

US 2008/0251644 A1 Oct. 16, 2008

Related U.S. Application Data

(60) Provisional application No. 60/898,241, filed on Jan. 30, 2007, provisional application No. 61/011,974, filed on Jan. 23, 2008.

(51) Int. Cl.
*B64D 17/52* (2006.01)
(52) U.S. Cl. .................................................. 244/149
(58) Field of Classification Search ........................ None
See application file for complete search history.

(56) References Cited

U.S. PATENT DOCUMENTS

| 6,270,128 B1 * | 8/2001 | Coe ........................... 289/1.5 |
| 6,431,495 B1 * | 8/2002 | Lawyer ....................... 244/149 |
| 6,626,400 B1 | 9/2003 | Booth |

* cited by examiner

*Primary Examiner*—Timothy D Collins
*Assistant Examiner*—Joseph W Sanderson
(74) *Attorney, Agent, or Firm*—Frank B. Arenas, Esq.

(57) ABSTRACT

An article of manufacture, a retractable safety ripcord device for use with a reserve parachute; the device uses a non-metallic flexible line between a first end with handle, a second end with a loop and at least one rubber shock cord integrated into the line. Also used is a single handle and reserve pin releasably attached via the loop wherein the pin separates from the loop after activation.

11 Claims, 11 Drawing Sheets

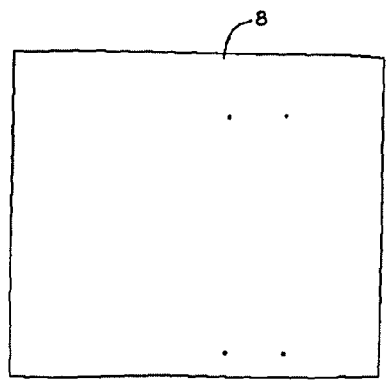
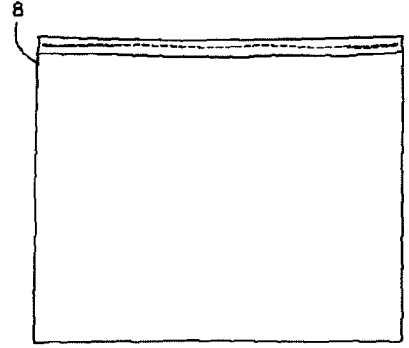
FIG. 4  FIG. 5
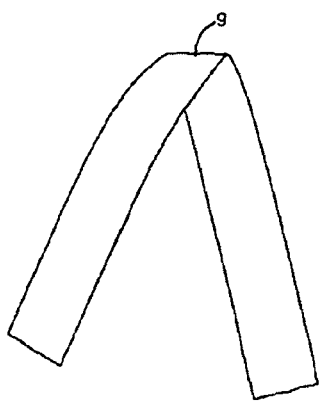
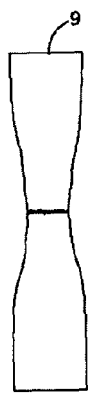
FIG. 6  FIG. 7  FIG. 8

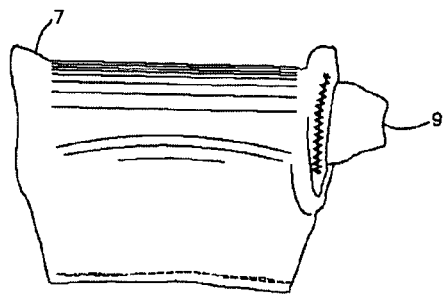
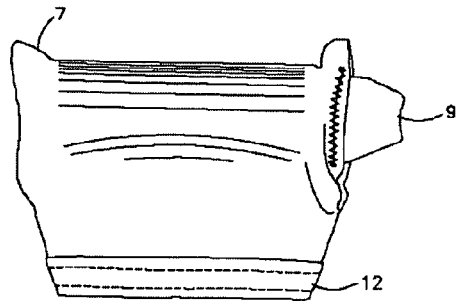
FIG. 17  FIG. 18
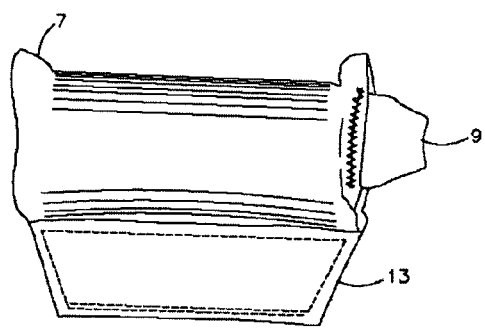
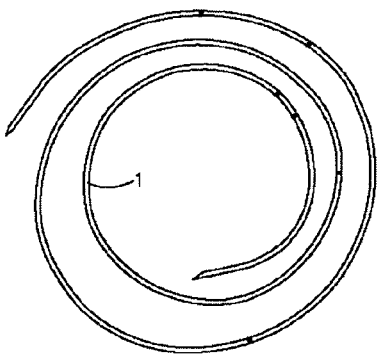
FIG. 19  FIG. 20

FIG. 21        FIG. 22
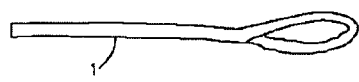
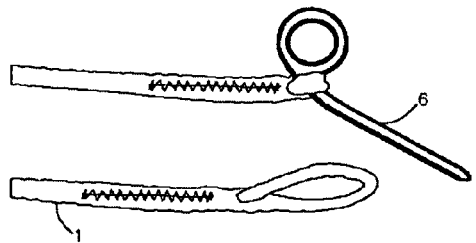
FIG. 23        FIG. 24

RETRACTABLE SAFETY RIPCORD

CROSS REFERENCE TO RELATED APPLICATIONS

This Nonprovisional Application for Patent incorporates by reference (to the extent it does not conflict with the disclosure herein) and claims the benefit and priority of pending Provisional Applications having Ser. No. 60/898,241 filed Jan. 30, 2007 and Provisional Application filed Jan. 23, 2008 having Ser. No. 61/011,974 both entitled "Retractable Safety Ripcord," both commonly owned with the instant Application.

COPYRIGHT NOTICE

A portion of the disclosure of this Patent document, including the drawings and Appendices, contain material which is subject to copyright protection. The copyright owner has no objection to the facsimile reproduction by anyone of the Patent document or the Patent disclosure as it appears in the Patent and Trademark Office Patent files or records, but otherwise reserves all copyright rights whatsoever.

BACKGROUND OF THE INVENTION

1. Field of the Invention

Versions and embodiments of the present invention relate generally to parachute equipment. Particularly, embodiments of the invention relate to reserve parachutes and deployment thereof. More particularly, versions of the invention relate to reserve parachute ripcords used for manual deployment of the reserve parachute. Specifically, versions of the invention relate to retractable safety ripcords for reserve parachutes and new, useful and unobvious versions thereof.

2. Description/Background of the Related Art

The art discussed herein is not to be considered admitted prior art but is presented to more clearly discuss and describe what is still lacking in the earlier art.

Ripcords for parachute container opening systems are conventionally made of steel cable with pins attached. Ripcord pins are made by hammering and drilling steel stock, and the ripcord is traditionally put together by swaging the pin(s) to one end, and a ball shank to the other. These pin(s) pass through fabric loops or cones to hold the parachute pack closed, until the ripcord is pulled.

To protect the ripcord cable, and to provide a low friction path to the ripcord handle, the ripcord is passed through a steel housing. Because the cable and pin(s) are steel, the housing must also be steel, or it would be destroyed by the abrasive nature of the cable and pin(s). This housing must also be large enough to allow passage of the attached pin(s). Because parachute harnesses and steel housings flex (or stretch) during motion in the aircraft, in freefall, and particularly during opening shock, there must be extra ripcord cable at the handle end to prevent accidental pulling of the ripcord pin(s).

While all steel ripcords work well, several problems/deficiencies have plagued their use for decades:

1. They are expensive to manufacture.
2. They are expensive to inspect, and cannot be fully inspected after installation. There is simply no way to determine if a swage is correctly done without removing the ripcord, and placing it in an expensive pull tester.
3. They can produce hard pulls, due to friction between the steel cable and housing, especially when pulled at an angle to the housing end.
4. The slack at the handle end is exposed, and could snag, causing an accidental deployment.
5. The steel cable can kink or "pig tail" causing a hard or impossible pull.
6. Because of the slack at the handle end, if a handle is knocked out of its pocket, it can float free, making it difficult or impossible to locate when needed.
7. The housings are large and hard, causing discomfort to the wearer.

Problems 2, 3, 4, 5, and 6 have caused fatalities in the past.

No ripcord device and/or system is known to this inventor that addresses the deficiencies in the earlier art as is used in conventional parachute ripcords. This new, useful and unobvious invention, in various embodiments, accomplishes this much needed advantage of increase in safety and reduction in manufacturing costs of conventional parachute ripcord devices and/or systems.

SUMMARY OF THE INVENTION

Advantages of versions of the present invention include avoidance of most if not all of the above problems by replacing the steel cable with a length of non-metallic flexible line (preferably SPECTRA), with a finger-locked and bar tacked loop at each end, and incorporating an elasticized center section. The elasticized center section may be elastic shock cord inserted into the hollow center of the non-metallic flexible line sewn at the "stretch mode" of the elastic shock cord and allowed to return to "relaxed mode" and compress the slack in the line in a "scrunch" as shown in FIG. 1. In best mode, one loop goes over a specially shaped, one piece, stamped stainless steel releasable pin, and the other loop is attached to the handle. The optional releasable pin rotates out of the way when pulled, and does not pass through the housing.

Benefits, features and problems solved by versions of the invention include:

1. Because no swaging is required, and the pin and Spectra ripcord section are so simple to manufacture, cost is greatly reduced.
2. Because all joints are formed by stitching, they are easily visually inspected in the field. No tools or disassembly is required.
3. Because Spectra has a much lower coefficient of friction than steel cable, pull forces are greatly reduced, especially at high angles to the housing end.
4. Because all of the slack in this Spectra ripcord is taken up by the elasticized center section, there is no external slack at the handle end to catch on anything.
5. Because all of the slack is taken up by the elasticized center section, it is impossible to accidentally generate a kink or pig-tail.
6. Because the slack is elastic, if a handle gets knocked out of its pocket, it will simply recoil back up against the housing end, and not float out of reach.
7. Because the releasable pin does not have to travel through the housing, and Spectra has a much lower coefficient of friction and steel cable, a much smaller housing, or simply a sewn channel can be used, increasing user comfort and saving money.
8. As an added bonus, a ripcord made out of 1,000 pound Spectra cord is also stronger and lighter than a steel ripcord.

The foregoing objects, benefits and advantages of versions of the invention are illustrative of those which can be addressed by versions of the invention and not intended to be limiting or exhaustive of the possible advantages that can be realized. These and other advantages will be apparent from the description herein or can be learned from practicing versions of the invention, both as embodied herein as examples or as modified in view of any variations which may be apparent to those of ordinary skill in the art. Therefore, the invention resides in the novel devices, methods, arrangements, systems, combinations and improvements herein shown and described as examples and not limited therein.

BRIEF DESCRIPTION OF THE DRAWINGS

In the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIGS. 4 through 34 depict the method and steps of making a preferred embodiment version of the invention.

Figure 1:
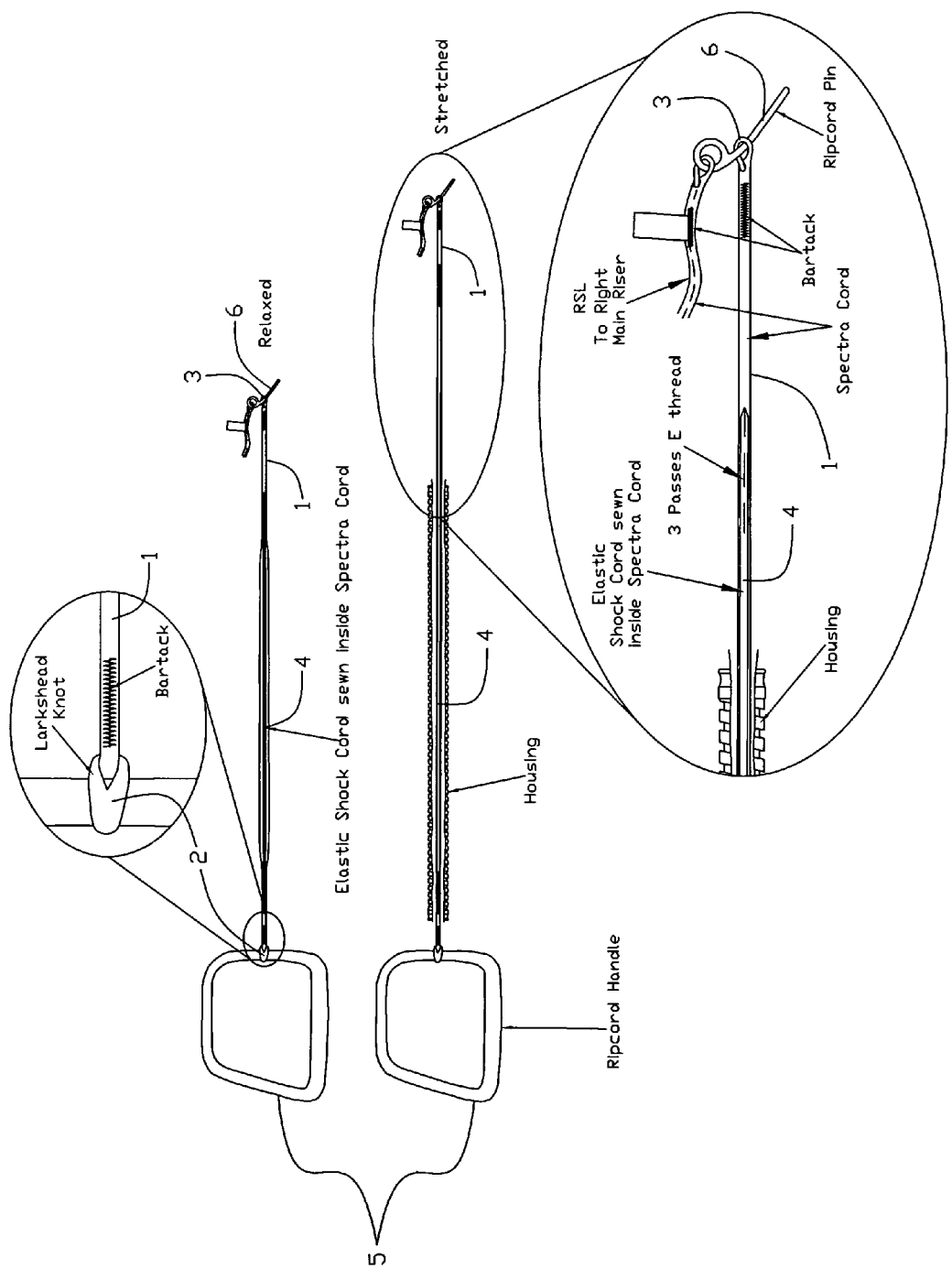
FIG. 1 is a side view of a version of the invention showing "relaxed" and "stretched" modes.

While the present invention will be described with reference to the details of the embodiments of the invention shown in the drawings (and some embodiments not shown in the drawings), these details are not intended to limit the scope of the invention. As would be known by one of average skill in the art, such as a parachute rigger, parachute equipment designer and/or parachute equipment manufacturer, modifications may be made that are intended to be within the scope of versions of the invention.

DETAILED DESCRIPTION OF THE PREFERRED EMBODIMENT

It is also understood that whenever and/or is used in this patent application it means any combination or permutation of all, one, some, a plurality or none of each of the item or list mentioned, which is not intended to be limiting but merely for example and illustration. It is also understood that (s) designates either singular or plural. It is also understood that that "or" is an inclusive "or" to include all items in a list and not intended to be limiting and means any combination or permutation of all, one, some, a plurality or none of each of the item or list mentioned. It is also understood that "include(s)" and/or "including" means "including but not limited to" any combination or permutation of all, one, some, a plurality or none of each of the item or list mentioned.

The core of the version of the preferred basic embodiment of the invention is depicted in FIG. 1A. The basic component is a non-metallic flexible line 1 (any suitable flexible cord, twine, rope, etc.) with an operator end with attachment means 2 and a pin end with attachment means 3 and an elastic spring means 4 disposed between the operator end with attachment means 2 and a pin end with attachment means 3. Additional optional components are an operator handle 5 and pin 6. Lines such as Dacron, Spectra, nylon, etc. are well know in the industry and may be used, as well as any other type line suitable for this purpose.

The attachment means may be of any suitable type—loop, aperture, glue, sewn, webbing, fastener, screw, bolt, weld, connector link (either hard or "soft" as known in the art), grommet, snap, rivet, thread, rope, twine, rod, dowel, hook, plug, connector, and/or any other means, either attached/secured permanently, temporarily and/or releasably attached.

The elastic spring means may be of any suitable type—rubber (both natural and/or synthetic), "shock cord," "bungee cord," spring, coil and/or any suitable elastic material. Elastic spring means is hereby defined as able to return to its original shape and/or form without operator input after being forced out of its original shape and/or form.

The components may be attached, connected, linked, related, affixed, disposed on, integrated into, adjoined, combined, bonded, united, associated, joined, tied, secured, bound, rigidly attached, flexibly attached, attached with rotational freedom in at one least axis, and/or integrated onto each other as desired by the operator.

At least one of the basic components is necessary but a plurality may be utilized if desired for different versions of the invention. This basic embodiment replaces the conventional reserve ripcord in the conventional art. This great improvement over the prior art expands greatly the operator's control of the reserve ripcord prior to use and reduces the operator-pull forces of the conventional parachute ripcords when used.

Versions of the invention may be made with any and all suitable materials desired as needed for the appropriate use and is not limited by the type of materials that may be used. Versions are all scalable and may be made any suitable size; large, small and/or any size as desired. Versions of the invention may be retrofitted to existing (used) conventional reserve ripcords and/or manufactured as new ripcords.

Figure 9:
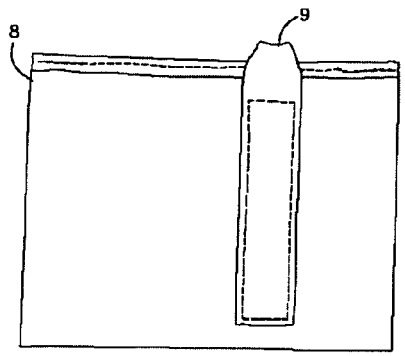
Figure 10:
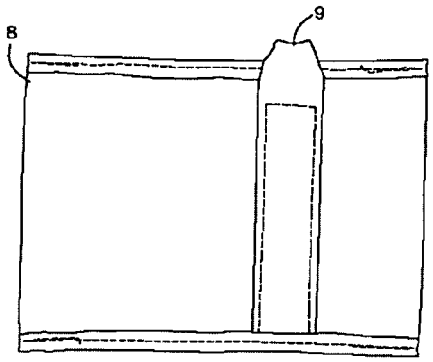
Figure 11:
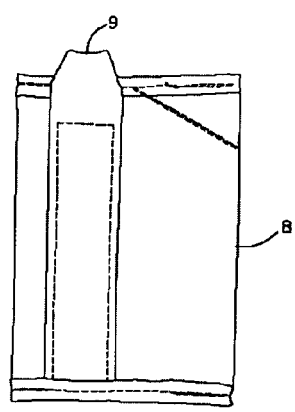
Figure 12:
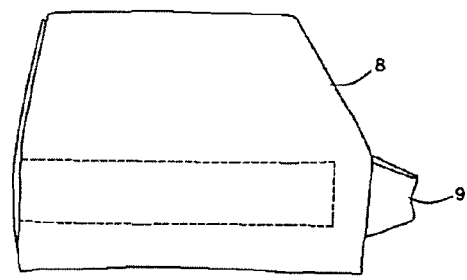
Figure 13:
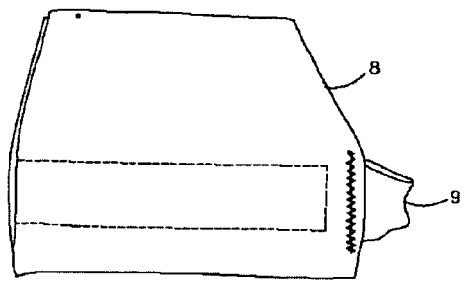
Figure 14:
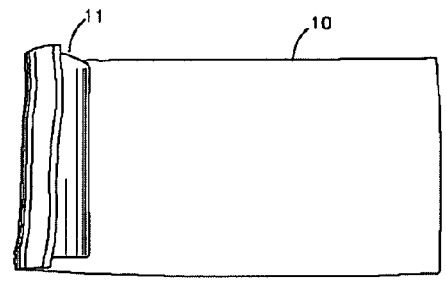
Figure 15:
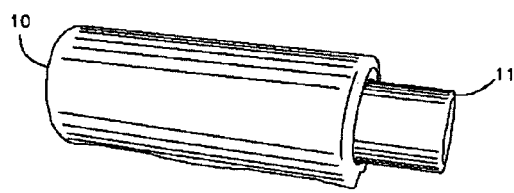
Figure 16:
Figure 25:
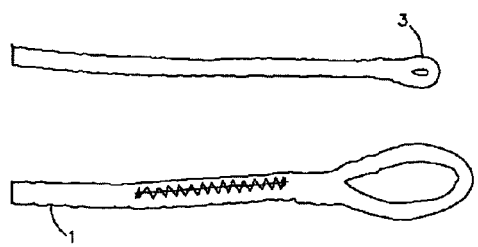
Figure 26:
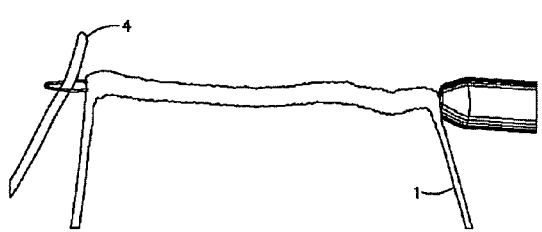
Figure 27:
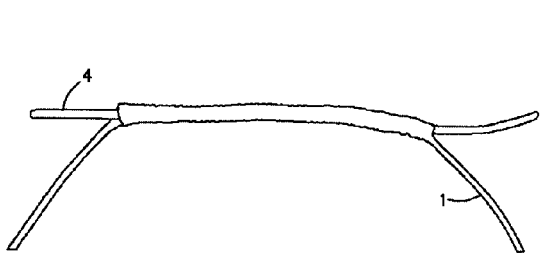
Figure 28:
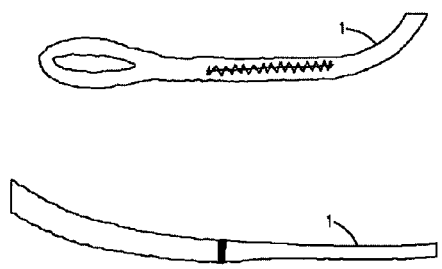
Figure 29:
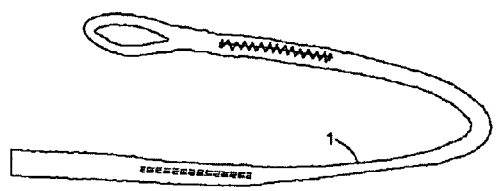
Figure 30:
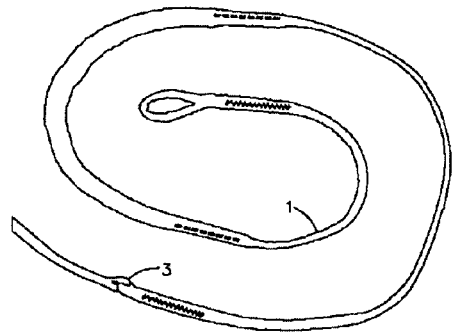
Figure 31:
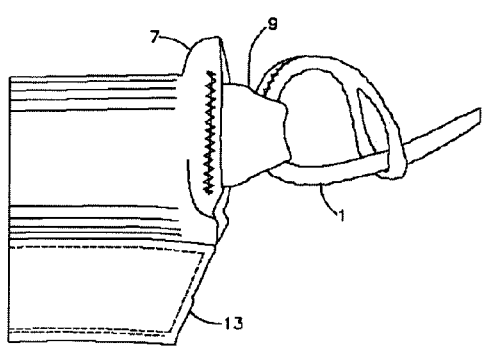
Figure 32:
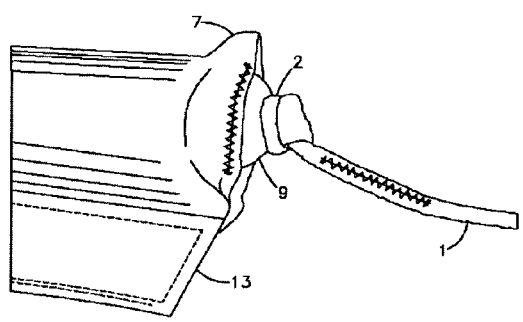
Figure 34:
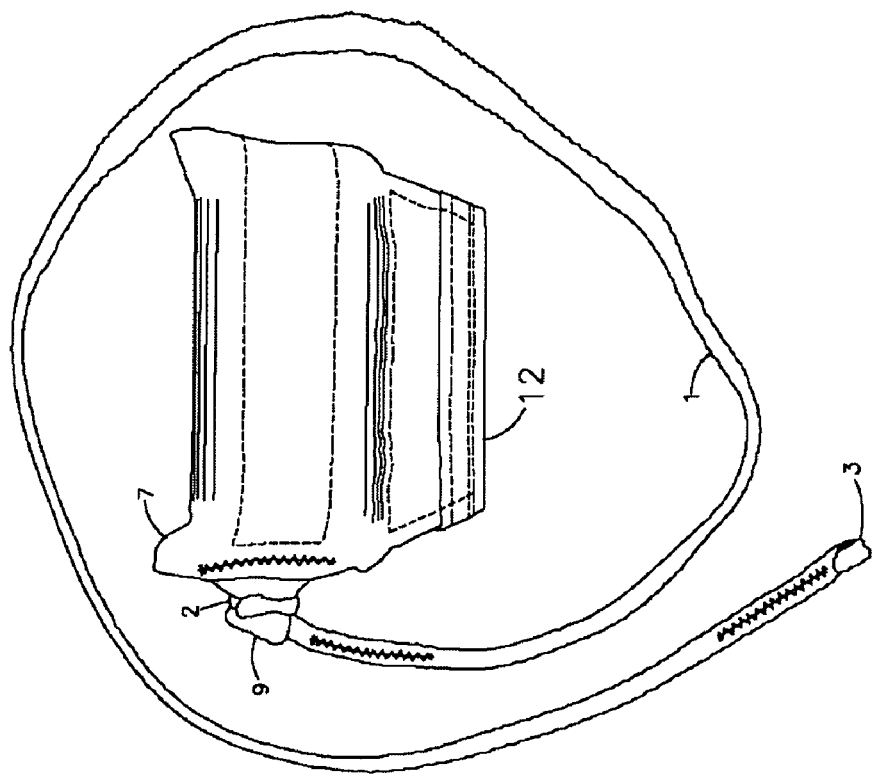
Figure 33:
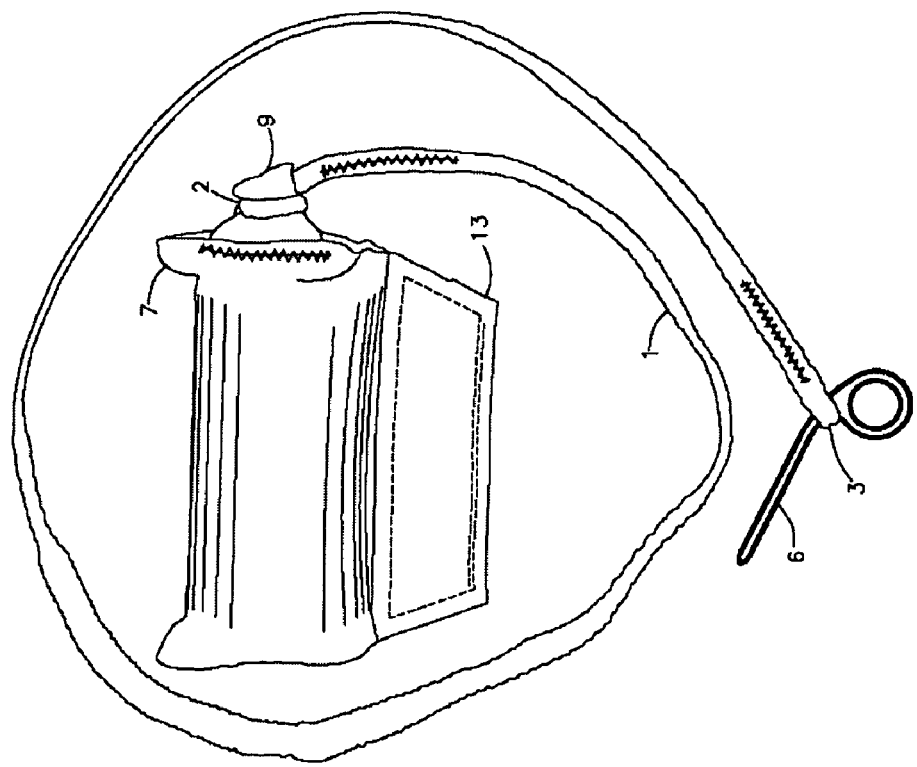

To make the invention in a basic embodiment, one skilled in the art would cut out one piece of Cordura 8 and mark template # as shown in FIG. 4, fold over top, long, edge of fabric ¼" and single needle prep using E thread as shown in FIG. 5. Cut a piece of 1" Type 4 9, 10" long, and fold in half as shown in FIG. 6. Butterfly in the middle using zig-zag pattern as shown in FIG. 7 and fold in half as shown in FIG. 8. Line up pre-folded (anchor) along lower marks. Prep-sew will follow pre-made marks; over-sew along bottom per FIG. 9. Mark anchor ¾" down from top end per FIG. 9. Fold lower edge of Cordura 8 over anchor as shown in FIG. 10 and prep-sew as in FIG. 5. Fold Cordura 8 in half, prep-sew using pattern per FIG. 11. Leave area under anchor open. Turn pouch inside out per FIG. 12. Add one 1", 42 stitch bar-tack over anchor per FIG. 13. Add one mark at open end 0.75" up from bottom as also shown in FIG. 13. Cut one piece of ⅛" Volara foam 10, and roll around 3" PVC tube 11 per FIG. 14. Using scotch tape, tack down foam 10 per FIG. 15. FIG. 16 depicts the finished tube 11 with foam 10 padding. Insert the pre-made tube assembly shown in FIG. 16 into pouch 7 as shown in FIG. 17. Fold lower corner inward using pre-made mark as guide. This gives the pouch 7 a symmetrical profile. Prep-sew opening, locking each end, also shown in FIG. 17. Bind the edge as shown in FIG. 18 and trim the binding tape 12 ends using a hot knife, also shown in FIG. 18. Per FIG. 19, install hook Velcro 13 to the pillow (the pre-made tube assembly inserted into the pouch). Start at the indicated point and sew around the perimeter of the Velcro 13 and over sew at front edge. Trim the Velcro 13 (also known as touch-fastener) to the size of the pillow making sure the angle is correct as also shown in FIG. 19. Per FIG. 20, cut one length of 1000 lbs Spectra (also known as non-metallic flexible line 1) according to ripcord length chart (a suitable length), and mark per template. Per FIG. 21, cut one length 8" of ⅛ black shock cord (also known as elastic spring means 4). As shown in FIG. 22, pin end (with attachment means 3): this end will have ¼" open loop. NOTE* Insert a short length of 1000 lbs Spectra through pin loop so opening will remain open until inserting pin at packing time. As shown in FIG. 23, anchor end (also known as operator end with attachment means 2): Fold at middle mark, finger-trap, and mate marks, 1" open loop. Per FIG. 24, Pin end (also known as pin end with attachment means 3): bar-tack will stop at mouth of finger-trap, this will prevent loop from getting bigger and coming off of pin loop-head. NOTE* Pin 6 shows how it will be inserted through ¼" loop per FIG. 24. Bar-tack will be easier to install with white line through ¼" loop. Per FIG. 25, Anchor side (also known as operator end with attachment means 2): Bar-tack will start ½ down from mouth of finger-trap. Per FIG. 26, feed ⅛ black shock cord (also known as elastic spring means 4), through line (also known as non-metallic flexible line 1) using a finger-trapping fid, or wire. Per FIG. 27, pull shock cord (also known as elastic spring means 4) through line (also known as non-metallic flexible line 1) past pre-made indicated mark. Per FIG. 28 push shock cord back into line and line up with mark. Per FIG. 29, tack down using 3 point stitch pattern, 1" long. FIG. 30 shows one version of the completed assembly. FIG. 31, FIG. 32, FIG. 33 and FIG. 34 show methods for attaching optional soft handle and optional reserve pin.

The primary requirements for successful use of versions of the invention are the design parameters set by the equipment manufacturer. These requirements may vary from one particular equipment manufacturer to another. Versions of the invention may be used with tandem reserve parachute systems to allow operation by an instructor and student and/or instructor and cargo after exiting an aircraft in flight.

Figure 2:
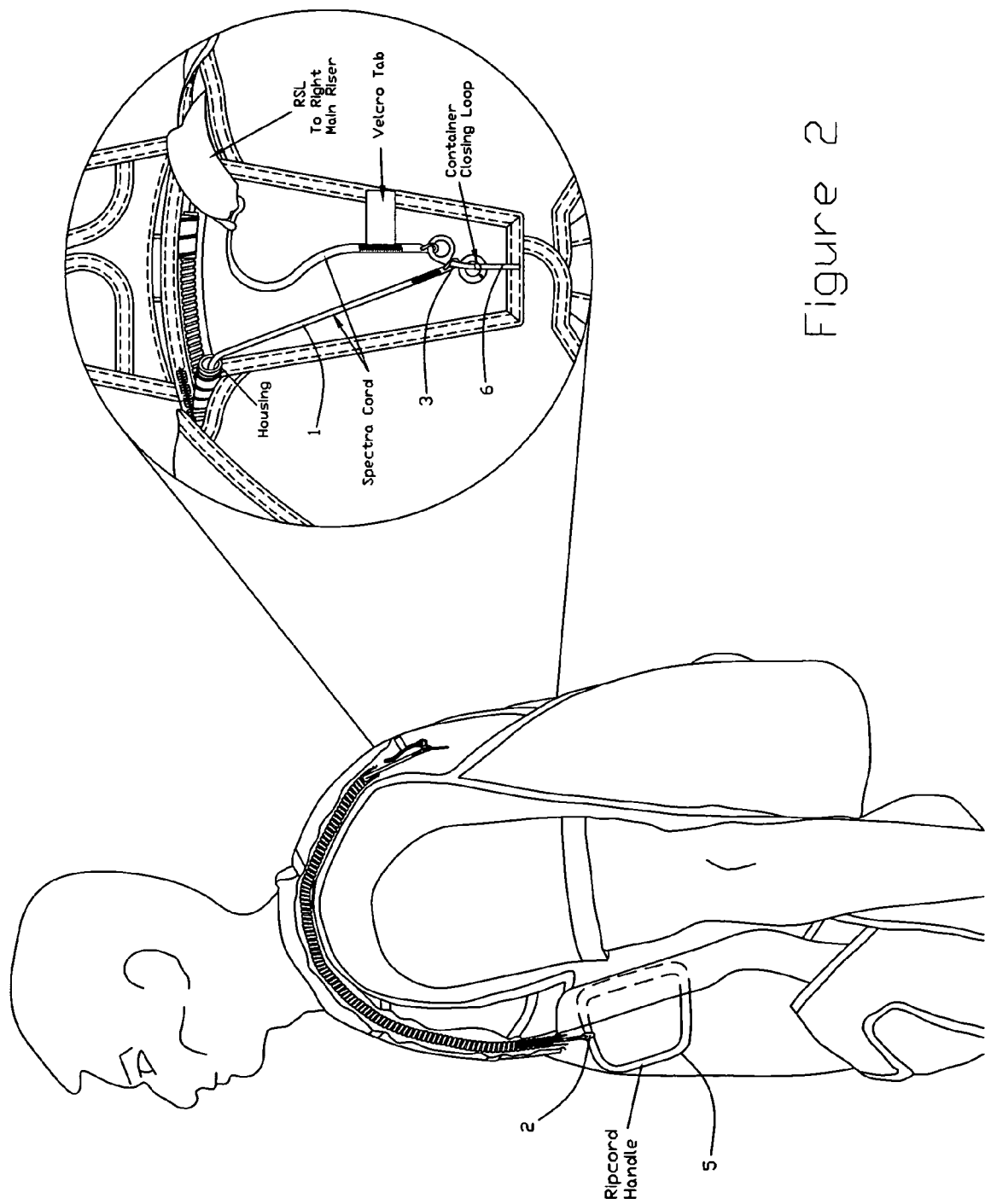
FIG. 2 is a perspective and detail view of a version of the invention installed on a typical parachute harness and container system.

To use the invention in this embodiment, one skilled in the art would insert the pin end with attachment means 3 of the non-metallic flexible line 1 into the front end of a cavity (housing and/or channel) disposed in or on the parachute system as shown in FIG. 2 until it extends out the back end of the cavity (housing and/or channel). Then, the optional handle (typically a "D" ring handle, common in the industry) attached to the operator end with attachment means 2 is inserted to the ripcord handle pocket (well known in the industry) and the pin end with attachment means 3 attached to the reserve closing pin 6. The elastic spring means 4 disposed between the operator end with attachment means 2 and a pin end with attachment means 3 remains in the cavity (housing and/or channel) in relaxed mode that contains all of the "slack" therein. If the operator desires to deploy the reserve parachute, she pulls the retractable safety ripcord operator end which stretches the elastic spring means 4 until stretched completely, allowing the pull force to be transferred to the line and pulled taught, thus pulling the reserve ripcord pin and opening the reserve container for deployment.

Figure 3:
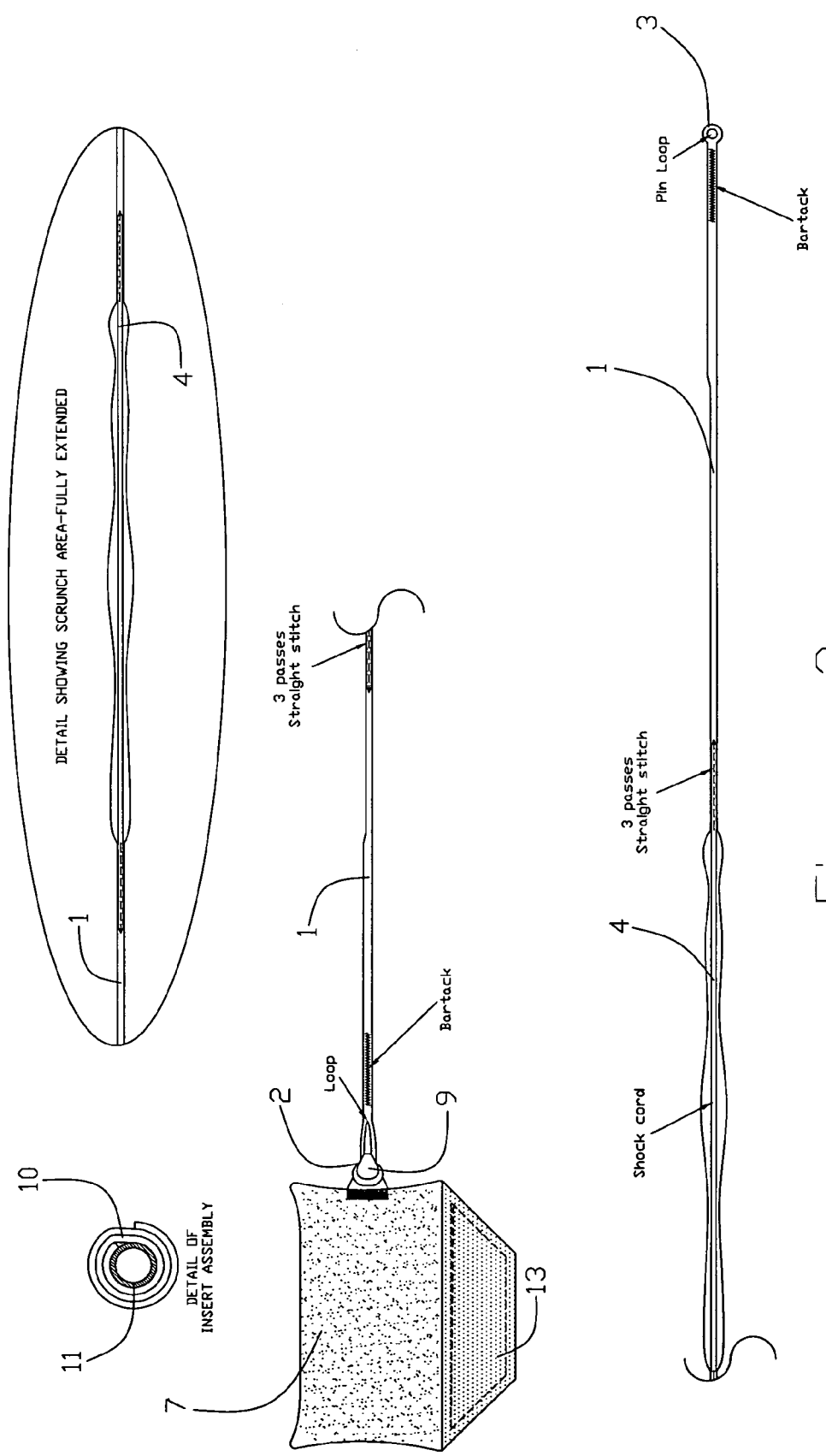
FIG. 3 is a side view of another version of the invention with details of the "scrunch" area fully extended and "insert assembly" for optional soft handle.

FIG. 3 shows an optional "soft" handle as known in the industry.

The above-referenced list(s), option(s), function(s), instruction(s), component(s), application(s), interaction(s), item(s), product(s), good(s), group(s) and sub-group(s) are merely intended as illustration and examples, and are not intended by the inventor to in any way limit the addition, deletion or modification of any said list(s), option(s), function(s), instruction(s), component(s), application(s), interaction(s), item(s), product(s), good(s), group(s) and sub-group(s) as might be desirable or useful to someone skilled in the art.

As will be apparent to persons skilled in the art, such as a person in the parachute industry, parachute rigger, parachute designer, parachute manufacturer or other similar-type individuals, various modifications and adaptations of the structure and method of use above-described will become readily apparent without departure from the spirit and scope of the invention, the scope of which is defined in the claims. Although the foregoing invention has been described in detail by way of illustration and example, it will be understood that the present invention is not limited to the particular description and specific embodiments described but may comprise any combination of the above elements and variations thereof, many of which will be obvious to those skilled in the art. Additionally, the acts and actions of fabricating, assembling, using, and maintaining the preferred embodiment of this invention is well known by those skilled in the art. The invention may be embodied in other specific forms without departing from the spirit or essential characteristics thereof. The present embodiment is therefore to be considered in all respects as illustrative and not restrictive, the scope of the invention being indicated by the claims rather than by the foregoing description, and all changes which come within the meaning and range of equivalency of the claims are therefore intended to be embraced therein.

I claim:

1. An article of manufacture, a retractable safety ripcord device for use with a reserve parachute system, comprising:
    at least one non-metallic means for connecting between a first end with attachment means and a second end with attachment means; and
    the second end with attachment means further comprises at least one loop; and
    at least one elastic spring means integrated into the means for connecting; and
    further comprising a single handle attached to the first end; and
    further comprising at least one pin releasably attached via the loop on the second end wherein the pin separates from the loop after activation.

2. The device of claim 1 further comprising wherein said means for connecting is at least one non-metallic line of suitable length and diameter.

3. The device of claim 1 wherein said elastic spring means further comprises at least one rubber shock cord.

4. The device of claim 1 further comprising installation in a tandem reserve parachute system and operable by an instructor and student after exiting an aircraft in flight.

5. The device of claim 1 further comprising installation in a tandem reserve parachute system and operable by an instructor and cargo after exiting an aircraft in flight.

6. An article of manufacture, a retractable safety ripcord device for use with a reserve parachute system, comprising:
    at least one non-metallic flexible line of suitable length and diameter, further comprising a first end and a second end; and
    further comprising at least one elastic shock cord integrated into the line between the first end and the second end; and
    further comprising a single handle attached to said first end; and
    further comprising at least one loop integrated onto the second end; and
    further comprising at least one pin releasably attached to said second end via the loop wherein the pin separates from the loop after activation.

7. The device of claim 6 further comprising installation in a tandem reserve parachute system and operable by an instructor and student after exiting an aircraft in flight.

8. The device of claim 6 further comprising installation in a tandem reserve parachute system and operable by an instructor and cargo after exiting an aircraft in flight.

9. An article of manufacture, a retractable safety ripcord device for use with a reserve parachute system, comprising:
- at least one non-metallic flexible hollow line of suitable length and diameter, further comprising a first end and a second end; and
- further comprising at least one elastic shock cord integrated into the center of the hollow line in a predetermined configuration between the first end and the second end; and
- further comprising a single handle attached to the first end; and
- further comprising at least one loop attached to the second end; and
- further comprising at least one pin releasably attached via the loop attached to the second end wherein the pin separates from the loop after activation.

10. The device of claim 9 further comprising installation in a tandem reserve parachute system and operable by an instructor and student after exiting an aircraft in flight.

11. The device of claim 9 further comprising installation in a tandem reserve parachute system and operable by an instructor and cargo after exiting an aircraft in flight.

* * * * *